(12) United States Patent
Verma et al.

(10) Patent No.: US 8,603,628 B2
(45) Date of Patent: Dec. 10, 2013

(54) TURBINE BLADE PROTECTIVE BARRIER

(75) Inventors: Gaurav Verma, Attleboro, MA (US); Vincent Garreau, Boston, MA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 858 days.

(21) Appl. No.: 11/742,220

(22) Filed: Apr. 30, 2007

(65) Prior Publication Data
US 2008/0268258 A1  Oct. 30, 2008

(51) Int. Cl.
*B32B 37/30* (2006.01)
*B32B 27/00* (2006.01)

(52) U.S. Cl.
USPC ...... 428/343; 428/421; 427/393.5; 427/407.1

(58) Field of Classification Search
None
See application file for complete search history.

(56) References Cited

U.S. PATENT DOCUMENTS

| | | | |
|---|---|---|---|
| 4,183,506 A * | 1/1980 | Teshima et al. | 266/88 |
| 4,915,981 A | 4/1990 | Traskos et al. | |
| 5,262,241 A | 11/1993 | Huggins | |
| 5,385,683 A | 1/1995 | Ransom | |
| 5,403,882 A | 4/1995 | Huggins | |
| 5,443,865 A | 8/1995 | Tisdale et al. | |
| 5,529,479 A | 6/1996 | Souders | |
| 5,696,207 A | 12/1997 | Vargo et al. | |
| 5,848,769 A | 12/1998 | Fronek et al. | |
| 5,908,704 A | 6/1999 | Friedman et al. | |
| 6,004,102 A | 12/1999 | Kuefner et al. | |
| 6,083,652 A | 7/2000 | Duggan et al. | |
| 6,159,547 A | 12/2000 | McMordie et al. | |
| 6,362,271 B1 | 3/2002 | Lin et al. | |
| 6,380,313 B1 | 4/2002 | Dillon et al. | |
| 6,444,311 B1 | 9/2002 | Friedman et al. | |
| 6,462,009 B1 | 10/2002 | Nagy et al. | |
| 6,513,339 B1 | 2/2003 | Kopko | |
| 6,517,774 B1 | 2/2003 | Bray et al. | |
| 6,586,514 B2 | 7/2003 | Chiang et al. | |
| 6,652,943 B2 | 11/2003 | Tukachinsky et al. | |
| 6,729,846 B1 * | 5/2004 | Wobben | 416/241 A |
| 6,740,260 B2 | 5/2004 | McCord | |

(Continued)

FOREIGN PATENT DOCUMENTS

EP  0 137 519 B1  8/1991
EP  0 289 869 B1  3/1995

(Continued)

OTHER PUBLICATIONS

International Search Report dated Mar. 31, 2009, 1 pg.

(Continued)

*Primary Examiner* — Callie Shosho
*Assistant Examiner* — Cheng Huang
(74) *Attorney, Agent, or Firm* — Chi Suk Kim; Abel Law Group, LLP

(57) ABSTRACT

A method of manufacturing a turbine blade includes providing a multilayer polymeric film. The multilayer polymeric film includes a first layer including an acrylic-based adhesive, a second layer disposed over the first layer, and a third layer disposed over the second layer. The second layer includes a blend of an acrylic polymer and fluoropolymer. The third layer has at least a portion with a smooth surface. The third layer includes fluoropolymer. The method further includes laminating the multilayer polymeric film over at least a portion of a turbine blade work piece. The first layer contacts the turbine blade work piece.

19 Claims, 3 Drawing Sheets

(56) References Cited

U.S. PATENT DOCUMENTS

| | | |
|---|---|---|
| 6,872,048 B2 * | 3/2005 | Uselton et al. ............... 415/119 |
| 7,070,850 B2 | 7/2006 | Dietz et al. |
| 2002/0111415 A1 | 8/2002 | Mack, Sr. et al. |
| 2003/0013850 A1 | 1/2003 | Springer et al. |
| 2003/0087053 A1 | 5/2003 | Fukushi |
| 2003/0198770 A1 | 10/2003 | Fukushi et al. |
| 2003/0207118 A1 | 11/2003 | Fukushi |
| 2004/0058162 A1 | 3/2004 | Tukachinsky et al. |
| 2004/0127614 A1 | 7/2004 | Jiang et al. |
| 2004/0137252 A1 | 7/2004 | Bonnet et al. |
| 2005/0143508 A1 | 6/2005 | Tyagi et al. |
| 2005/0180902 A1 | 8/2005 | Fraser et al. |
| 2005/0186431 A1 | 8/2005 | Hetzler et al. |
| 2005/0216075 A1 | 9/2005 | Wang et al. |
| 2005/0245631 A1 | 11/2005 | Gould et al. |
| 2005/0258404 A1 | 11/2005 | McCord |
| 2005/0268961 A1 | 12/2005 | Hetzler et al. |
| 2005/0271867 A1 | 12/2005 | Hetzler et al. |
| 2006/0020067 A1 | 1/2006 | Brant et al. |
| 2006/0041090 A1 | 2/2006 | Chung et al. |
| 2006/0057363 A1 | 3/2006 | Takahashi et al. |
| 2006/0070790 A1 | 4/2006 | Kejha |
| 2007/0122218 A1 | 5/2007 | Kageyama |
| 2008/0237909 A1 * | 10/2008 | Bech ............................ 264/101 |

FOREIGN PATENT DOCUMENTS

| | | |
|---|---|---|
| EP | 0865900 A | 9/1998 |
| EP | 0 728 776 B1 | 10/1998 |
| EP | 0 739 953 B1 | 11/2002 |
| EP | 0 960 918 B1 | 7/2004 |
| GB | 2115075 A | 9/1983 |
| WO | WO 93/03919 | 3/1993 |
| WO | WO 93/03921 | 3/1993 |
| WO | WO 99/32234 | 7/1999 |
| WO | WO 01/79771 A1 | 10/2001 |
| WO | WO 02/099261 | 12/2002 |
| WO | WO 03/045689 A2 | 6/2003 |
| WO | WO 03/068503 A1 | 8/2003 |
| WO | WO 2004/055229 A2 | 7/2004 |
| WO | WO 2004/060662 A1 | 7/2004 |
| WO | WO 2005/066278 A1 | 7/2005 |
| WO | WO 2005/081859 A2 | 9/2005 |
| WO | 2005/092586 A | 10/2005 |
| WO | WO 2005/118275 A2 | 12/2005 |
| WO | WO 2006/045630 A2 | 5/2006 |
| WO | WO 2006/089805 A1 | 8/2006 |

OTHER PUBLICATIONS

Corten, G. P., et al., "Insects Can Halve Wind-Turbine Power," Nature, vol. 412, Jul. 5, 2001, 1 pg, www.nature.com, including review = Science News, vol. 160, No. 5, p. 73, Aug. 4, 2001.

* cited by examiner

1 …

TURBINE BLADE PROTECTIVE BARRIER

FIELD OF THE DISCLOSURE

This disclosure, in general, relates to turbine blade protective barriers and methods for forming turbine blades.

BACKGROUND

Increasingly, energy producers are turning to alternative energy sources. In particular, energy producers are turning to wind power and solar power to produce electricity. Often, wind power is produced using large turbines arrayed in a power generation field placed in mountainous regions that experience high wind or on coastal regions that experience daily cycles of wind.

Despite advances in turbine blade design, a need continues to exist for improved designs including improved protective coatings for turbine blades and methods for forming such turbine blades.

SUMMARY

In a particular embodiment, a method of manufacturing a turbine blade includes providing a multilayer polymeric film. The multilayer polymeric film includes a first layer including an acrylic-based adhesive, a second layer disposed over the first layer, and a third layer disposed over the second layer. The second layer includes a blend of an acrylic polymer and fluoropolymer. The third layer has at least a portion with a smooth surface. The third layer includes fluoropolymer. The method further includes laminating the multilayer polymeric film over at least a portion of a turbine blade work piece. The first layer contacts the turbine blade work piece.

In another exemplary embodiment, a turbine blade includes a blade having a trailing edge and a leading edge, and a multilayer polymer film disposed over at least a portion of the blade. The multilayer polymer film includes a first layer including an acrylic-based adhesive, a second layer disposed over the first layer, and a third layer disposed over the second layer. The second layer includes a blend of an acrylic polymer and a fluoropolymer. The third layer has a smooth surface and includes a fluoropolymer.

In a further exemplary embodiment, a turbine blade includes a blade having a trailing edge and a leading edge and having a front surface and a back surface. The turbine blade also includes a multilayer polymer film disposed over a portion of the blade. The portion of the blade extends from a first point located on the back surface, across the leading edge, to a second point located on the front surface of the blade. The first point is located not greater than one half of a distance extending from the leading edge to the trailing edge along the back surface. The second point is located not greater than one half of a distance extending from the leading edge to the trailing edge along the front surface. The multilayer polymer film includes a first layer including an acrylic-based adhesive. The first layer is disposed over the blade. The multilayer polymer film also includes a second layer disposed over the first layer. The second layer includes a blend of an acrylic polymer and a fluoropolymer. The multilayer polymer film further includes a third layer disposed over the second layer. The third layer includes a first fluoropolymer.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

In an embodiment, a turbine blade includes a blade having a leading edge and a trailing edge. The turbine blade also includes a multilayer polymer film disposed on at least a portion of an outer surface of the blade. The multilayer polymer film includes a first layer disposed over the portion of the surface of the blade. The first layer includes an acrylic adhesive. The multilayer polymeric film also includes an intermediate layer disposed over the first layer. Further, the multilayer polymeric film includes a third layer disposed over the intermediate layer. The intermediate layer and the third layer may include a fluoropolymer. The third layer has a smooth surface free of surface features. In particular, the smooth surface may have a roughness (Rz) not greater than 10 micrometers.

In a particular embodiment, the polymeric film may be disposed over a portion of the surface extending from the leading edge to a point not greater than halfway between the leading edge and the trailing edge. For example, the multilayer polymeric film may extend on a front side from the leading edge to a point halfway between the leading edge and the trailing edge or may extend over the backside of the blade from the leading edge to a point halfway between the leading edge and the trailing edge. In particular, the multilayer polymeric film may extend from a point located on the front side of the blade not greater than halfway between the leading edge and the trailing edge, across the leading edge, to a second point located on the backside of the blade not greater than halfway between the leading edge and the trailing edge.

In another embodiment, a method for manufacturing a turbine blade includes providing a multilayer polymeric film having a first layer, an intermediate layer, and a third layer. The method further may include laminating the multilayer polymeric film to a blade surface, such as laminating the film to extend from a point not greater than halfway between the leading edge and the trailing edge of the blade on the front side, around the leading edge, to a second point not greater than halfway between the leading edge and the trailing edge on the backside of the blade.

Figure 1:
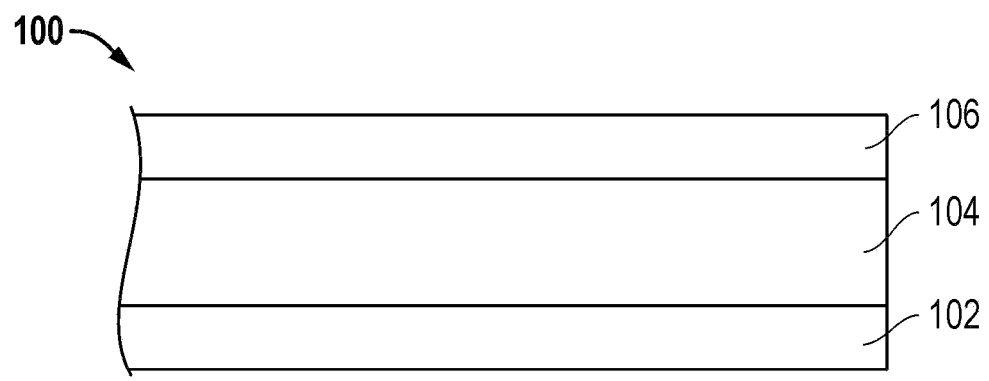
FIG. 1 and FIG. 2 include illustrations of exemplary embodiments of multilayer films.

In an exemplary embodiment, the multilayer film includes an outer surface layer formed of a fluoropolymer and includes an adhesive layer on an opposite surface of the film. As illustrated in FIG. 1, a multilayer polymeric film 100 may include an outer layer 106 disposed over an intermediate layer 104 that is disposed over an inner layer 102. While a three-layer configuration including layers 102, 104 and 106 is illustrated, a multilayer film including three, four, five, or more layers may be used. In particular, the intermediate layer 104 may be substituted with multiple layers.

In a particular embodiment, the multilayer film is a three-layer film in which the outer layer 106 directly contacts the intermediate layer 104 and the intermediate layer 104 directly contacts the inner layer 102. In particular, the outer layer 106 may adhere directly to the intermediate layer 104 without intervening adhesives and the intermediate layer 104 may directly contact and directly adhere to the inner layer 102 without intervening adhesives.

In an exemplary embodiment, the outer layer 106 includes a fluoropolymer. An exemplary fluoropolymer may be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. An exemplary fluoropolymer includes a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), or any blend or any alloy thereof. For example, the fluoropolymer may include FEP. In a further example, the fluoropolymer may include PVDF. In an exemplary embodiment, the fluoropolymer may be a polymer crosslinkable through radiation, such as e-beam. An exemplary crosslinkable fluoropolymer may include ETFE, THV, PVDF, or any combination thereof. An exemplary THV resin is available from Dyneon 3M Corporation Minneapolis, Minn. An ECTFE polymer is available from Ausimont Corporation (Italy) under the trade name Halar. Other fluoropolymers used herein may be obtained from Daikin (Japan) and DuPont (USA). In particular, FEP fluoropolymers are commercially available from Daikin, such as NP-12X. An example PVDF is available commercially under the tradename Kynar.

In particular, the outer layer 106 may be a blend of fluoropolymers with another polymer. For example, the outer layer 106 may include a blend of fluoropolymer with an acrylic. An acrylic polymer may be formed from a monomer having an alkyl group having from 1-4 carbon atoms, a glycidyl group or a hydroxyalkyl group having from 1-4 carbon atoms. Representative acrylic polymers include polymethyl methacrylate, polyethyl methacrylate, polybutyl methacrylate, polyglycidyl methacrylate, polyhydroxyethyl methacrylate, polymethyl acrylate, polyethyl acrylate, polybutyl acrylate, polyglycidyl acrylate, polyhydroxyethyl acrylate and mixtures thereof.

The acrylic polymer may, for example, be an impact grade or impact modified acrylic. Impact-modified acrylic polymers generally comprise a copolymer of monomers of acrylic monomers with an effective amount of suitable comonomer or graft moiety to produce the desired elastic modulus and impact resistance. An acrylic elastomer, sometimes referred to as acrylate rubber, polyacrylate rubber, polyacrylic elastomer or "ACM" and which is a composition based on a mixture of a polyacrylate and polymethacrylate, a polyacrylate and ethylene methacrylate copolymer ("EMAC") (such as Chevron Chemicals EMAC 2260), or a polyacrylate and ethylene butylacrylate ("EBAC") can be used. Alternatively, a thermoplastic impact-modified acrylic polymer can be a blend of a clear glassy acrylic polymer, such as a plastic copolymer of ethylene and a carboxylic acid compound selected from acrylic acid, methacrylic acid and mixtures thereof, with elastomeric components, for example.

In an embodiment, the impact-modified acrylic polymer may include fine particles of the elastomer dispersed uniformly in the plastic copolymer. The impact grade acrylic may comprise transparent toughened thermoplastic blends prepared by blending 10 to 99 weight percent of a block copolymer; 0.1 to 1 weight percent of particulate rubber having a particle size from 0.1 to 10 microns; and the balance a clear glassy polymer. Another suitable technique for making impact-modified acrylic polymer employs the use of a "core/shell" product, such as Atofina DR-101 resin. These generally are polymer particles that have a central core of one polymer surrounded by a shell of another polymer. The core can be either the plastic or elastomer component and the shell will be the opposite, i.e., elastomer or plastic component. The core/shell particles are fed to a melt mixing apparatus, such as a melt extruder in which the core and shell domains are blended in the melt phase to form a homogeneous blend on a much smaller scale and a film is formed from the extrudate of this homogeneous blend.

In an exemplary embodiment, the outer layer 106 includes at least about 70 wt % fluoropolymer. For example, the outer layer 106 may include at least about 85 wt % fluoropolymer, such as at least about 90 wt % fluoropolymer, or even 100 wt % fluoropolymer.

In addition, the outer layer 106 may include a filler such as an inorganic filler including, for example, silica, alumina, alumina silicate, titania, zirconia, ceria, or any combination thereof. In particular, the outer layer 106 may include the filler in an amount of about 5 wt % to about 30 wt %.

In particular, the outer layer 106 may be smooth, such as being free of engineered surface features. For example, the outer layer 106 may have a surface roughness (Rz) of not greater than about 10 micrometers, such as not greater than about 5 micrometers, or even not greater than about 1 micrometer. In a particular example, the surface roughness may be not greater than about 500 nanometers.

In an exemplary embodiment, the outer layer 106 has a thickness of about 5 microns to about 250 microns. For example, the outer layer 106 may have a thickness of about 12.5 microns to about 125 microns, such as about 25 microns to about 50 microns. In particular, the outer layer 106 forms not greater than about 20 percent by volume of the multilayer film, such as not greater than about 10 percent by volume, or even not greater than about 5 percent by volume of the multilayer film.

Intermediate layer 104 generally lies between the outer layer 106 and the adhesive layer or inner layer 102. In an exemplary embodiment, the intermediate layer 104 includes a fluoropolymer. For example, the intermediate layer 104 may contain the same fluoropolymer as used in the outer layer 106. Alternatively, a different fluoropolymer may be used in forming the intermediate layer 104. The intermediate layer 104 may include a blend of fluoropolymer and an acrylic polymer. Generally, the intermediate layer 104 includes at least about 30 percent by weight of fluoropolymer, such as at least about 50 percent by weight, or at least about 60 percent by weight of the fluoropolymer. In particular, the intermediate layer 104 may include at least about 70 percent fluoropolymer. In addition, the intermediate layer may include not greater than about 70 percent by weight of an acrylic polymer. For example, the intermediate layer 104 may include not greater than about 40 percent, such as not greater than about 30 percent of an acrylic polymer. Further, the intermediate layer may include at least about 1 percent acrylic polymer, such as at least about 5 percent, at least about 10 percent, or even at least about 15 percent of the acrylic polymer.

In an alternative embodiment, the intermediate layer 104 may include a blend of acrylic polymer and other components. For example, the intermediate layer 104 may include at least about 70% by weight of the acrylic polymer, such as impact grade acrylic polymer. In an exemplary embodiment, the intermediate layer 104 may include at least about 75%, at least about 80%, at least about 85%, or at least about 90% impact grade acrylic. Intermediate layer 104 also may include other components, such as the fluoropolymer. For example, the intermediate layer 104 may include no more than about 30% PVDF, PVDF copolymer or blend thereof by weight. In another exemplary embodiment, intermediate layer 104 may include no more than about 25%, no more than about 20%, no more than about 15%, or no more than about 10% PVDF by weight. In an embodiment, intermediate layer 104 consists essentially of acrylic polymer.

In addition, the intermediate layer 104 may include fillers, colorants, pigments, UV absorbents, antioxidants, processing aides, or any combination thereof. In particular, the intermediate layer 104 may include an ultraviolet radiation absorber, such as the Tenuvin®, available from Ciba Specialty Chemicals. Alternatively, an ultraviolet radiation absorber may be included in one or more of the layers 102, 104 and 106.

In an exemplary embodiment, the intermediate layer 104 has a thickness of at least about 25 microns, such as about 25 microns to about 1000 microns, or about 50 microns to about 500 microns, or even about 100 microns to about 400 microns. In general, the intermediate layer 104 forms at least about 40 percent by volume of the multilayer film.

In an exemplary embodiment, the adhesive layer or inner layer 102 is formed of an adhesive polymer. In particular, the adhesive polymer may be a pressure sensitive polymer or a thermal bonding polymer. For example, the adhesive polymer may be an acrylic polymer, such as a pressure sensitive acrylic polymer. In particular, the adhesive is configured to bond to metallic surfaces. Alternatively, the adhesive may exhibit peel strength when bonded with coated surfaces, such as epoxy coated or enamel coated metallic surfaces.

In a particular embodiment, the inner layer 102 has a thickness of about 5 microns to about 125 microns, such as about 12.5 microns to about 50 microns. In general, the inner layer 102 forms not greater than about 20 percent by volume of the multilayer film. For example, the inner layer 102 may form not greater than about 10 percent such as not greater than about 5 percent of the multilayer film.

The total film thickness may be between 35 microns and 1500 microns, such as between 40 microns and 1000 microns. In a further example, the total film thickness may be in a range between about 35 microns and about 400 microns, such as about 35 microns to about 100 microns.

In general, the outer layer 106 of the multilayer film 100 has a smooth surface over at least a portion of the film. Alternatively, portions of the surface may be patterned while other portions are smooth. For example, the outer surface of the multilayer film may be configured to have a smooth surface in a region configured to be disposed over a leading edge portion of a windmill turbine blade. In such an example, the outer surface may have a drag-reducing pattern in regions configured to cover a trailing edge portion of a windmill turbine blade.

Figure 2:
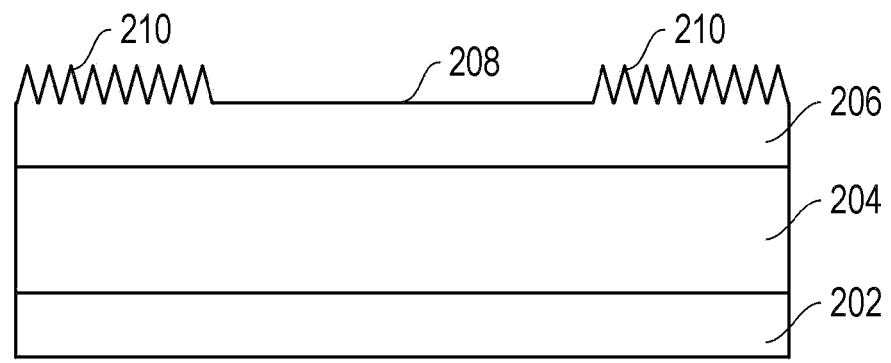

For example, FIG. 2 includes an illustration of a multilayer polymeric film having at least three layers, an inner layer 202, an intermediate layer 204, and an outer layer 206. In a middle region 208 of the outer layer 206, the surface of the outer layer is smooth such as having a low roughness (Rz) value. One or more edge regions 210 of the surface may have a pattern, such as a drag-reducing pattern disposed thereon. The one or more edge regions 210 may have a surface roughness (Rz) value of at least about 50 microns, such as at least about 60 microns, or even at least about 100 microns. When laminated to a blade, such as a windmill turbine blade, the drag reducing regions 210 are applied over a trailing edge portion, while the smooth surface region 208 is applied over a leading edge portion.

Figure 3:
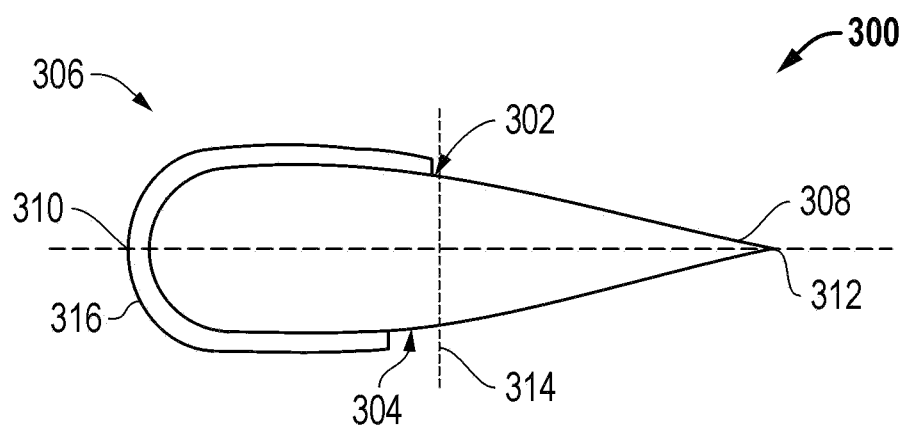
FIG. 3 and FIG. 4 include cross-sectional view illustrations of exemplary turbine blades.

For example, a windmill turbine blade 300 illustrated in FIG. 3 may include a front side 302 and a backside 304. In addition, the blade 300 may include a leading edge portion 306 located closer to a leading edge 310 of the blade 300. In addition, the blade 300 may include a trailing edge portion 308 located closer to a trailing edge 312. As illustrated, the leading edge portion 306 and the trailing edge 308 are divided by a median line 314.

In the embodiment illustrated in FIG. 3, a smooth surface film 316 is disposed over at least a portion of the leading edge region 306. In particular, the smooth surface film 316 may extend on either side (302 or 304) along the surface of the blade 300 from the leading edge 310 to a point not greater than the meridian 314. For example, the smooth surface multilayer film 316 may extend along either side (302 or 304) of the blade 300 from the leading edge 310 to a point not greater than halfway between the leading edge 310 and the trailing edge 312. Further, the smoothed surface multilayer film 316 may extend from the leading edge 310 to a point not greater than ⅓ of the distance between the leading edge 310 and the trailing edge 312, such as not greater than ¼ of the distance.

While the multilayer film is illustrated as extending to the meridian 314 from the leading edge 310 along both the front surface 302 and the back surface 304, the film 316 may extend to a different distance along the front side 302 than the back side 304. For example, the film may extend along the front surface 302 to a distance halfway between the leading edge 310 and the trailing edge 312 while the film 316 extends approximately ⅓ of the distance between the leading edge 310 and the trailing edge 312, along the back side 304.

Figure 4:
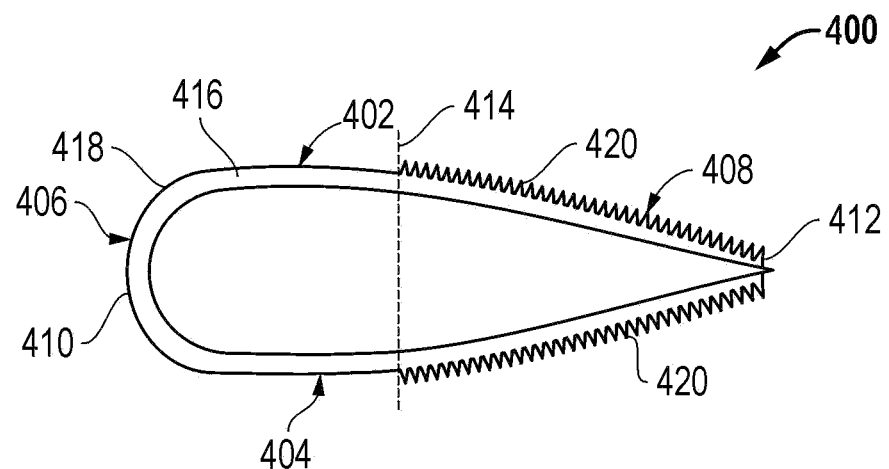

In an alternative embodiment illustrated in FIG. 4, the film 416 may include a smooth surface region 418 and a patterned surface region 420. For example, the smoothed surface region 418 of the film 416 extends along the leading edge to at least ¼ of the distance between the leading edge 410 and the trailing edge 412 along the front and back surfaces 402 and 404 of the blade 400. In particular, the smoothed surface region 418 may extend over the leading end region 406 to a point not further than the meridian 414 when viewed from the leading edge 410. As such, a surface patterned portion 420 of the film 416 may extend over at least the trailing edge of the region 408 of the blade 400.

Figure 5:
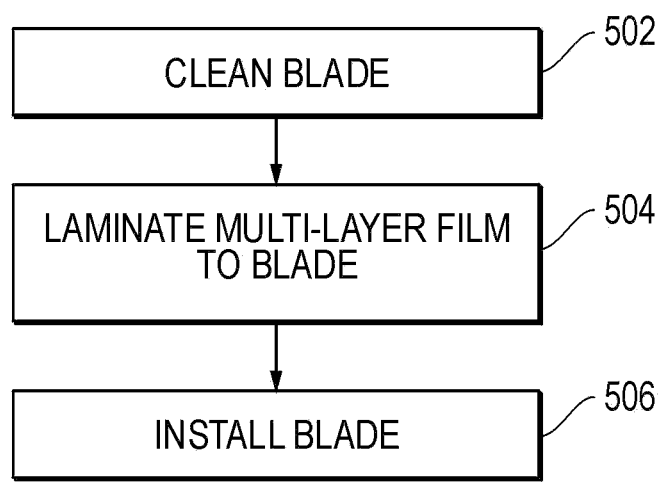
FIG. 5 includes a flow diagram illustration of an exemplary method for forming a turbine blade.

To form a turbine blade, a multilayered polymer film having a smooth surface over at least a portion of the surface of the multilayered polymer film may be laminated to a blade to form the turbine blade. In an exemplary method illustrated in FIG. 5, a blade is cleaned and treated in preparation for lamination of the multilayer film, as illustrated at 502. For example, the blade may be cleaned with a surfactant solution or a solvent. In particular, the blade may be cleaned with an aqueous solution or an alcohol solution. In a further exemplary embodiment, the blade maybe surface treated. For example, the surface of the blade may be corona treated, spray coated with coupling agents, or roughened to encourage adhesion of the multilayer polymeric film. In a particular embodiment, cleaning with an aqueous solution is sufficient for adequate adhesion of the multilayer polymeric film to the blade.

Once the blade is prepared, the multilayer polymeric film may be laminated to the blade, as illustrated at 504. For example, an adhesive layer of the multilayer film may be pressed to the surface of the blade to facilitate pressure bonding of the multilayer film to the blade. In another example, the multilayer film may be heat laminated to the blade. For example, the blade may be heated or alternatively, hot gasses such as hot air may be blown on the film as it is laminated to the blade. In addition, once laminated, the blade and film may be moderately heated to facilitate further bonding of the multilayer polymer film to the blade.

Once the laminated film is adhered to the blade, the blade may be installed in a turbine system, as illustrated at 506. For example, the blade may be installed on a large windmill system for electricity generation.

In particular, the multilayer polymeric film may be laminated to the blade such that the multilayer polymeric film has a smooth surface that extends to a point not greater than halfway from the leading edge of the blade to the trailing edge of the blade. As such, the blade includes a smooth surfaced film over at least a portion of the leading edge region of the blade. In addition, surface patterned portions of the multilayer film may be laminated to a trailing edge portion of the blade.

Particular embodiments of the turbine blade advantageously exhibit improved power performance. In particular, embodiments of the above turbine blade exhibit increased power production during high wind periods that follow low wind periods. For example, embodiments of the turbine blade may exhibit increased power production during high wind periods following low wind periods when the blades experience no precipitation between the low wind period and the high wind period.

In contrast, prior art blades may experience an accumulation of debris in changing wind conditions. For example, PCT publication WO 2004/060662 A1 and U.S. Pat. No. 7,070,850 disclose the use of fluoropolymer films having a drag-reducing surface illustrated as a pattern of ridges. In an example, the ridges have a peak height of 62.5 microns with a peak spacing of 62.5 microns and an angle between adjacent peaks of 53°. However, such films may contribute to the accumulation of debris and in particular, the illustrated surfaces may contribute to the entrapment or entrainment of debris, causing reduced maximum power output during periods of high wind following periods of low wind.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A turbine blade comprising:
   a blade having a trailing edge and a leading edge and having a front surface and a back surface; and
   a multilayer polymer film disposed over at least a portion of the blade, the multilayer polymer film comprising:
      a first layer including an acrylic-based adhesive;
      a second layer disposed over the first layer, the second layer comprising a blend of an acrylic polymer and a fluoropolymer; and
      a third layer disposed over the second layer, the third layer including a fluoropolymer;
   wherein the multilayer polymer film forms an outer surface having a smooth surface region and a patterned surface region, the smooth surface region having a surface roughness (Rz) of not greater than 10 microns and the patterned surface region having a surface roughness (Rz) of at least 50 microns, wherein the patterned surface region extends from the front surface over the trailing edge of the blade to the back surface.

2. The turbine blade of claim 1, wherein the surface roughness (Rz) of the smooth surface region is not greater than about 5 micrometers.

3. The turbine blade of claim 2, wherein the surface roughness (Rz) of the smooth surface region is not greater than about 1 micrometers.

4. The turbine blade of claim 1, wherein the third layer of the multilayer film includes at least about 70 wt % of the fluoropolymer.

5. The turbine blade of claim 1, wherein the at least a portion of the blade extends across the leading edge of the blade to first and second points not greater than one half of a distance between the leading edge and the trailing edge along the front surface and the back surface of the blade, respectively.

6. The turbine blade of claim 5, wherein the at least a portion of the blade extends across the leading edge of the blade to the first and second points located not greater than one third of the distance between the leading edge and the trailing edge along the front surface and the back surface of the blade, respectively.

7. The turbine blade of claim 5, wherein the at least a portion of the blade extends across the leading edge of the blade to the first and second points located not greater than one fourth of the distance between the leading edge and the trailing edge along the front surface and the back surface of the blade, respectively.

8. The turbine blade of claim 1, wherein the surface roughness (Rz) of the patterned surface region is at least 60 microns.

9. The turbine blade of claim 8, wherein the surface roughness (Rz) of the patterned surface region is at least 100 microns.

10. The turbine blade of claim 1, wherein the multilayer polymer film has a total thickness between 35 microns and 1500 microns.

11. The turbine blade of claim 1, wherein the multilayer polymer film has a total thickness is between 35 microns and 400 microns.

12. The turbine blade of claim 1, wherein the second layer forms at least 40% by volume of the multilayer polymer film and wherein the first layer forms not greater than 10% by volume of the multilayer polymer film.

13. The turbine blade of claim 1, wherein the surface roughness (Rz) of the patterned surface region is at least 100 microns.

14. The turbine blade of claim 1, wherein the surface roughness of the smooth surface region is not greater than 5 microns.

15. The turbine blade of claim 1 wherein the multilayer polymer film further includes a portion of the patterned surface region disposed closer to the trailing edge of the blade than the smooth surface region and the portion of the patterned surface extending over at least the trailing edge.

16. The turbine blade according to claim 1, wherein the smooth surface region is disposed along the outer surface between portions of the patterned region, the patterned region is disposed proximal to the trailing edge with portions on the front and back surfaces of the blade, respectively.

17. The turbine blade of claim 1, wherein the outer surface further comprises a portion of the patterned surface region having a surface roughness (Rz) of at least 50 microns, the smooth surface region disposed along the outer surface between portions of the patterned surface region.

18. A turbine system having a turbine blade, the turbine blade comprising:
   a blade having a trailing edge and a leading edge and having a front surface and a back surface; and
   a multilayer polymer film disposed over at least a portion of the blade, the multilayer polymer film comprising:

a first layer including an acrylic-based adhesive;

a second layer disposed over the first layer, the second layer comprising a blend of an acrylic polymer and a fluoropolymer; and a third layer disposed over the second layer, the third layer including a fluoropolymer;

wherein the multilayer polymer film forms an outer surface having a smooth surface region and a patterned surface region, the smooth surface region having a roughness (Rz) of not greater than 10 microns and the patterned surface region having a roughness (Rz) of at least 50 microns, wherein the patterned surface region extends from the front surface over the trailing edge of the blade to the back surface.

19. The turbine system according to claim 18, wherein the turbine system is a windmill system.

* * * * *